W. M. SCHLUER.
INTERCHANGEABLE VEHICLE.
APPLICATION FILED APR. 17, 1918.

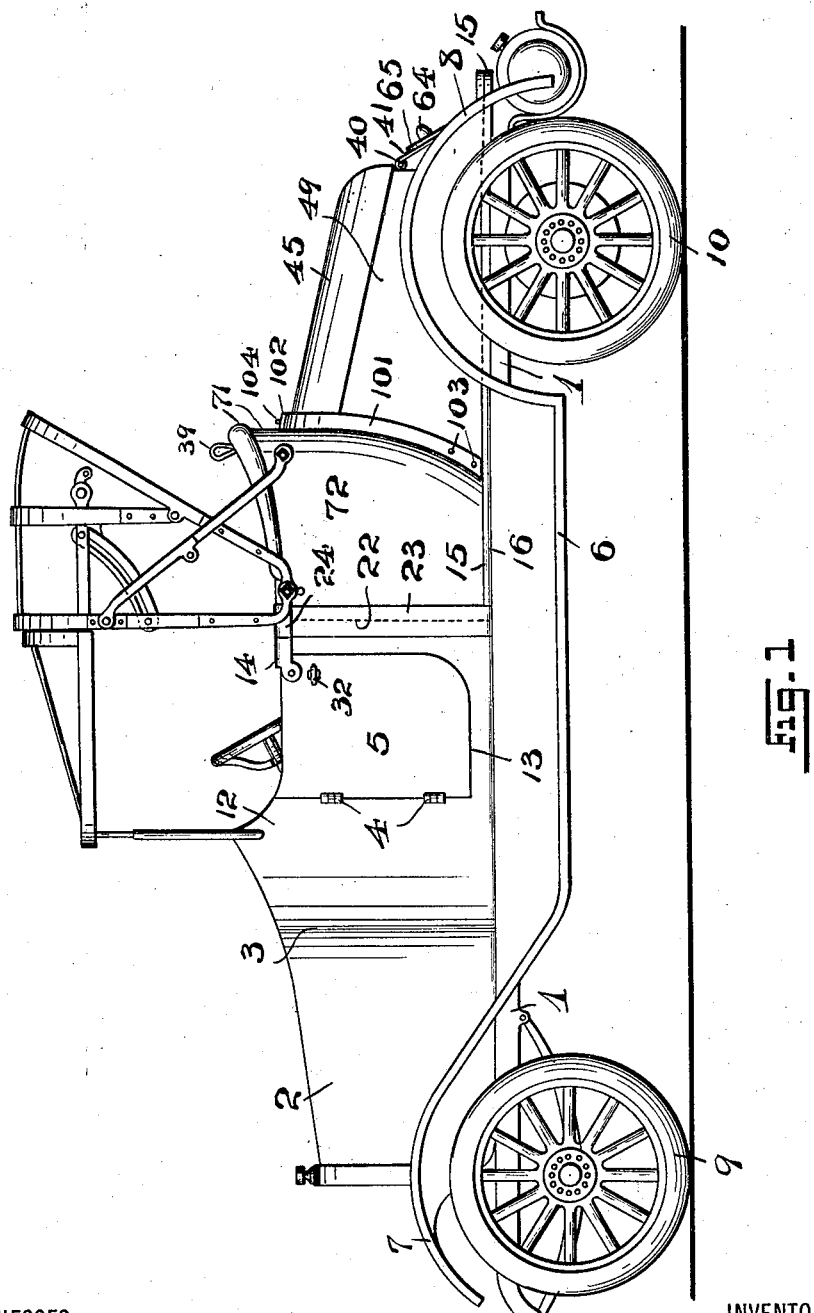

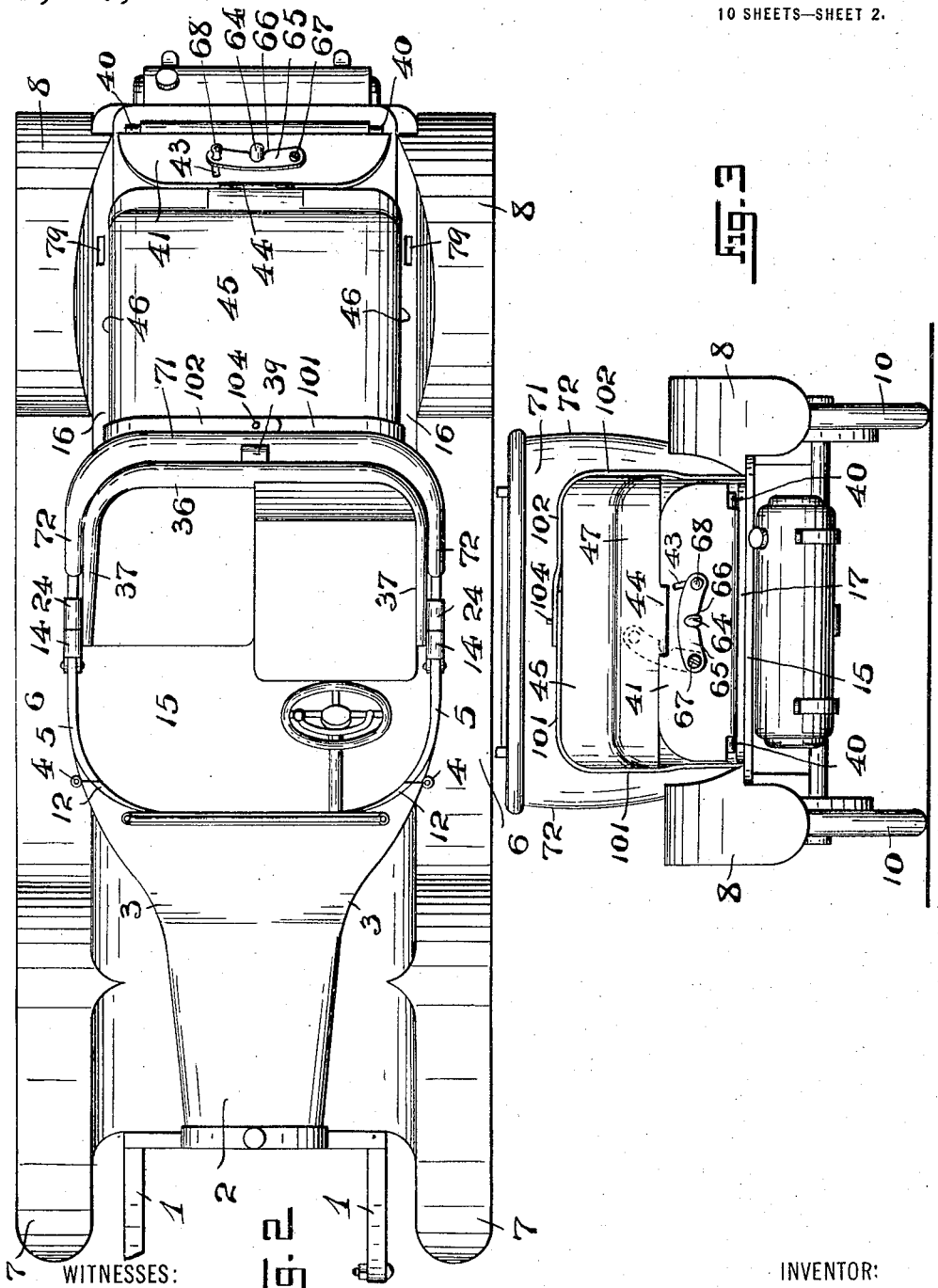

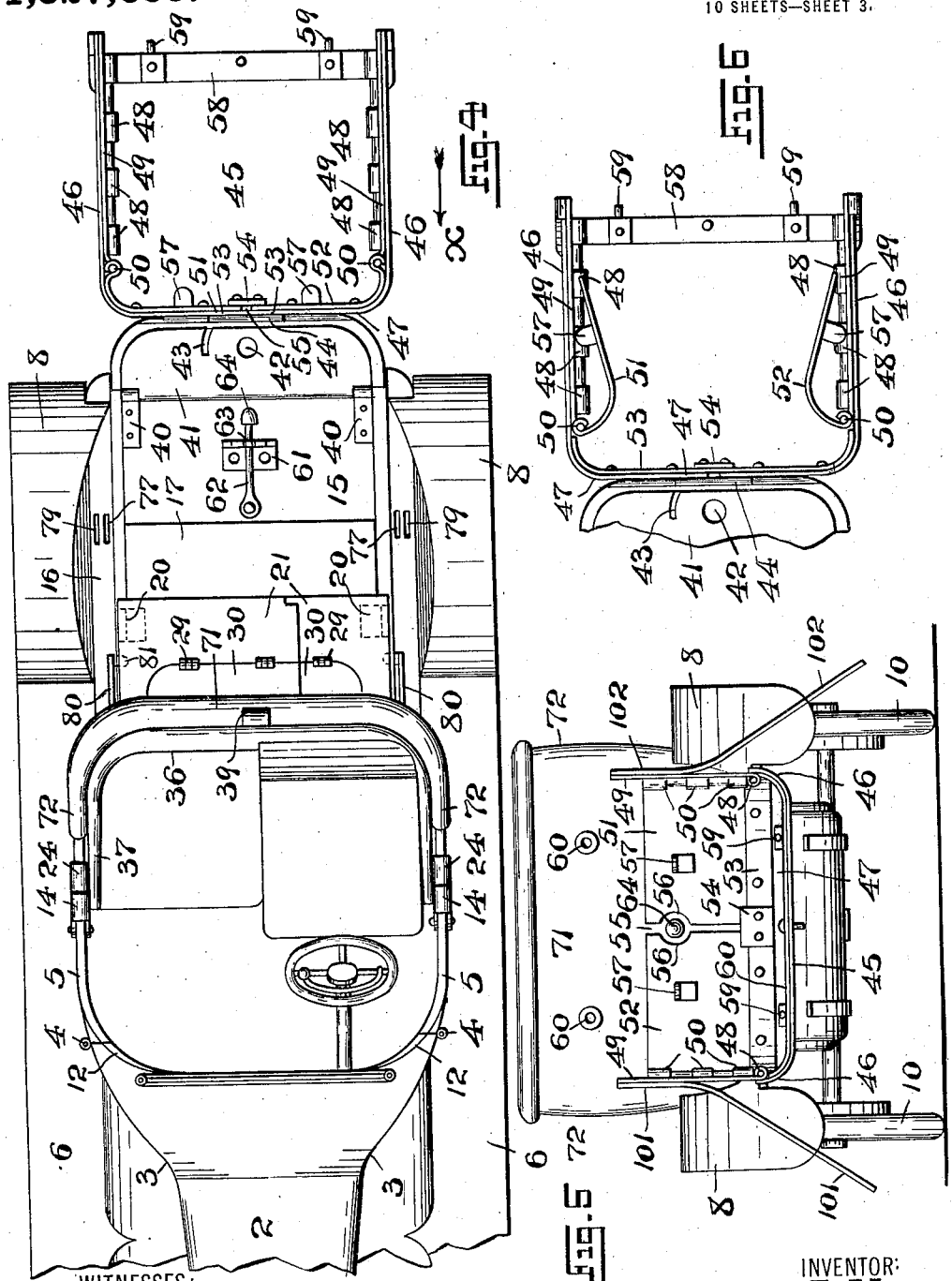

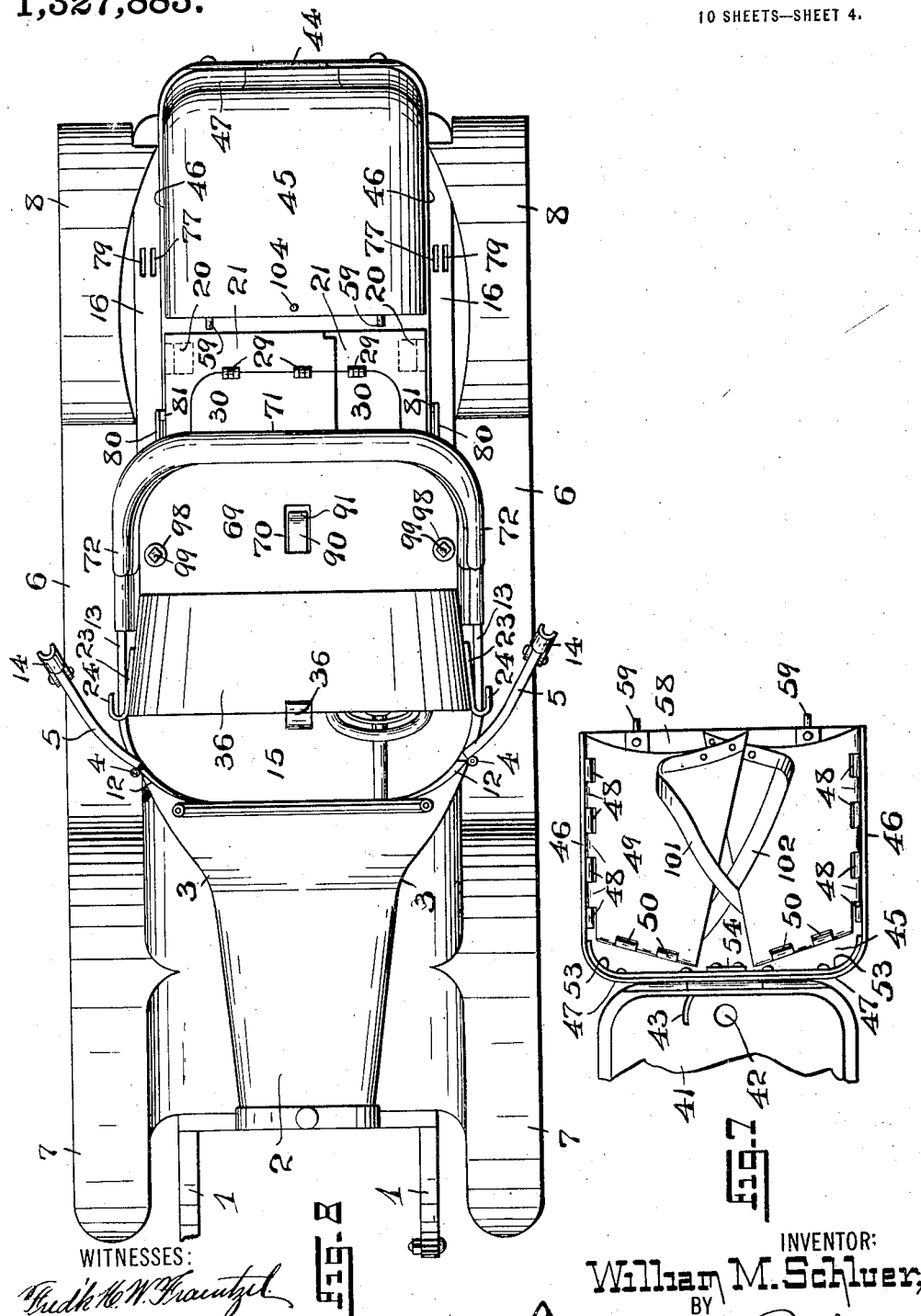

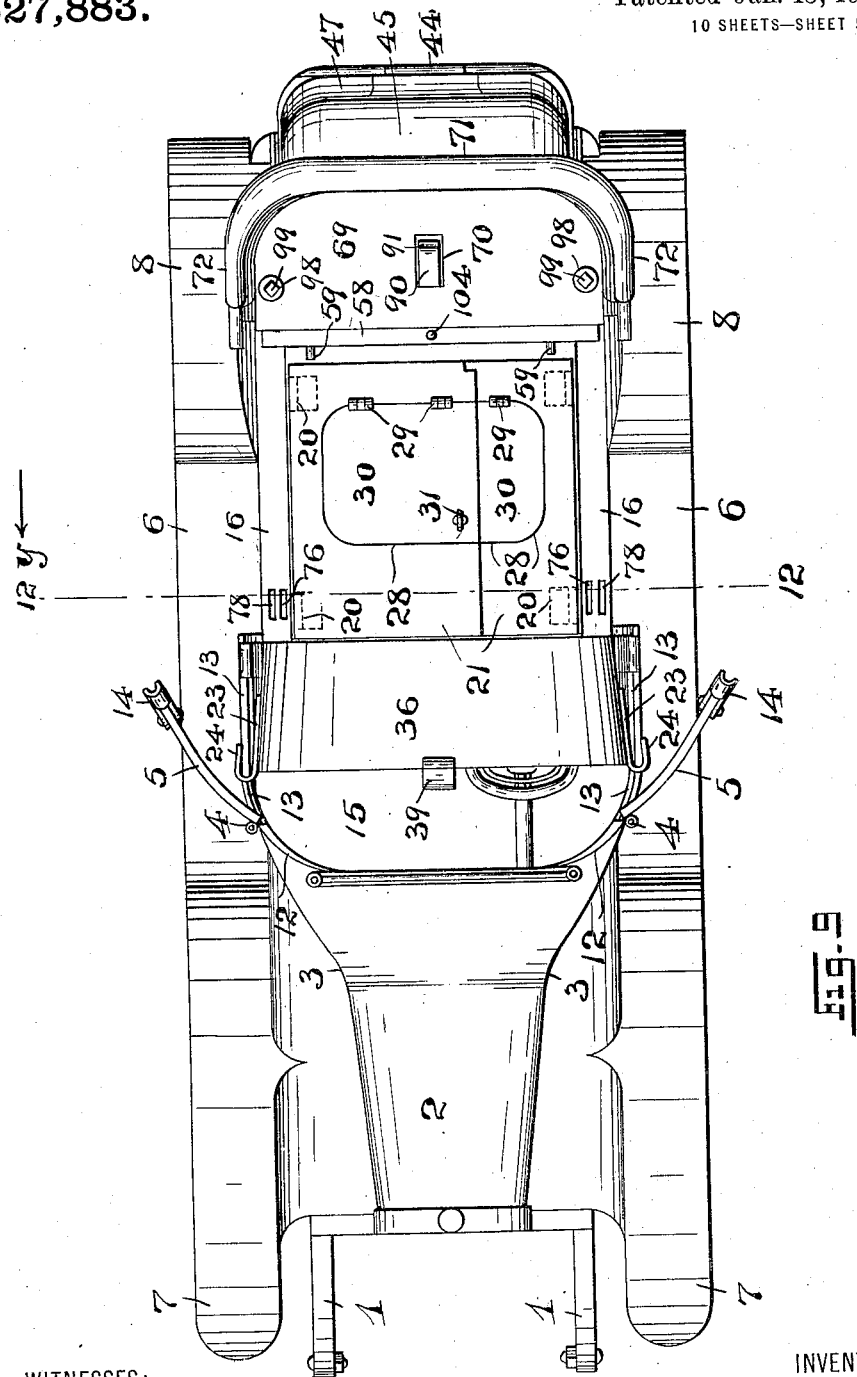

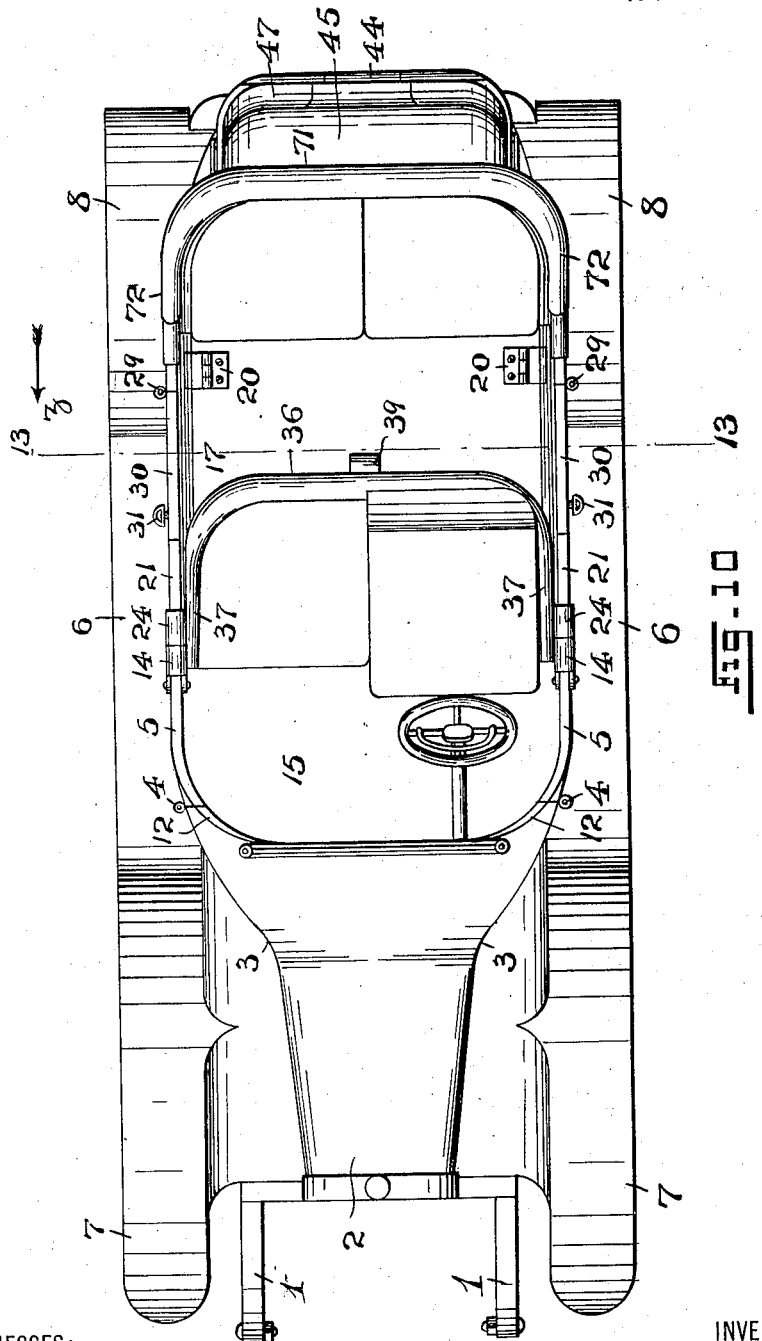

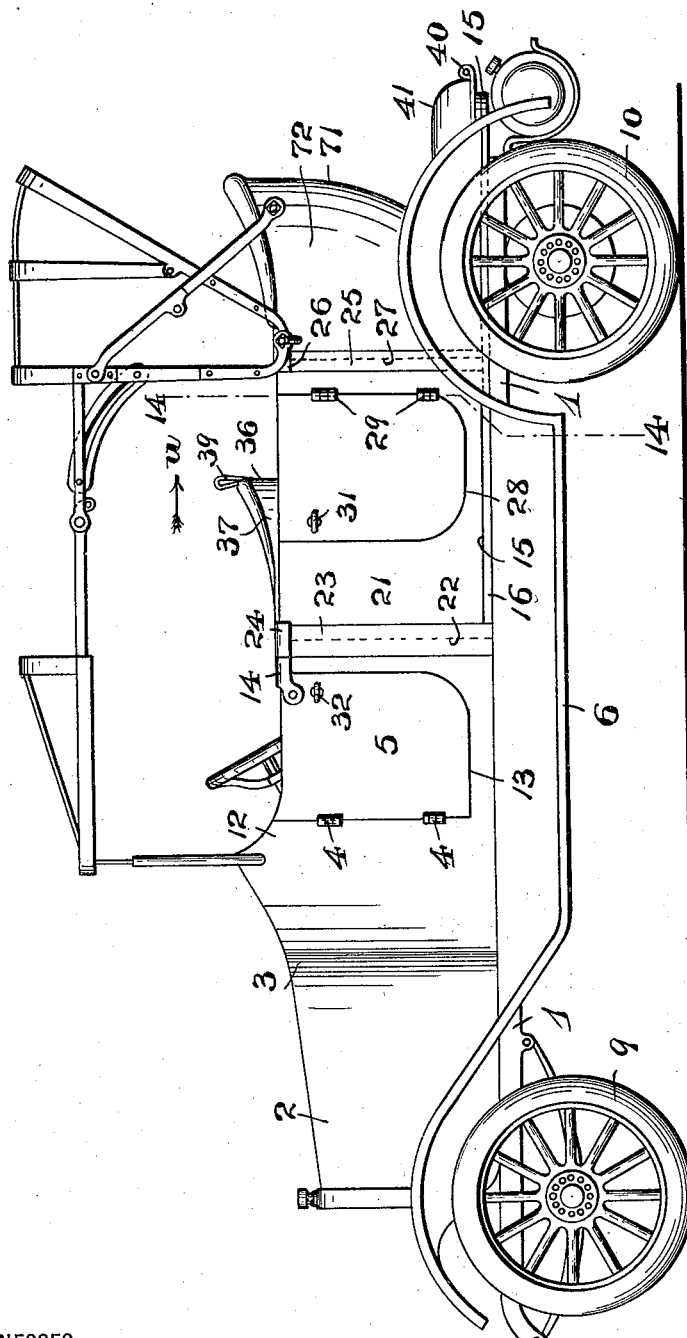

1,327,883.

Patented Jan. 13, 1920.
10 SHEETS—SHEET 8.

WITNESSES:

INVENTOR:
William M. Schluer,
BY
Fraentzel and Richards
ATTORNEYS.

W. M. SCHLUER.
INTERCHANGEABLE VEHICLE.
APPLICATION FILED APR. 17, 1918.

1,327,883.

Patented Jan. 13, 1920.
10 SHEETS—SHEET 9.

WITNESSES:
Fredk H W Fraentzel
Eva E. Lesch

INVENTOR:
William M. Schluer,
BY Fraentzel and Richards
ATTORNEYS

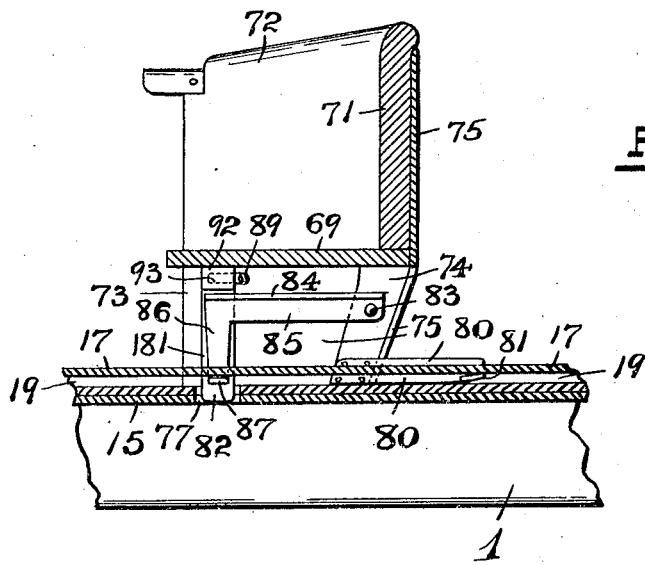
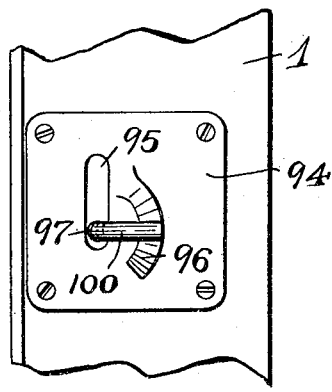

UNITED STATES PATENT OFFICE.

WILLIAM M. SCHLUER, OF ORANGE, NEW JERSEY.

INTERCHANGEABLE VEHICLE.

1,327,883.   Specification of Letters Patent.   Patented Jan. 13, 1920.

Application filed April 17, 1918. Serial No. 229,034.

*To all whom it may concern:*

Be it known that I, WILLIAM M. SCHLUER, a citizen of the United States, residing at Orange, in the county of Essex and State of New Jersey, have invented certain new and useful Improvements in Interchangeable Vehicles; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in vehicles; and the present invention has reference, more particularly, to a novel automobile comprising a main body or frame, certain parts or members of the said body being movably and interchangeably disposed upon the general frame-work or chassis of the said vehicle, whereby the latter is readily interchangeable from a two-seat vehicle, or "runabout" to a four-seated vehicle or touring car.

The present invention has for its principal objects to provide a vehicle of the general character hereinafter set forth, which is simple in its construction, and is of neat appearance, the main body or chassis of the vehicle being provided with movably and interchangeably disposed members or parts, all of simple construction and simple arrangement, whereby the same vehicle can be turned with ease and rapidity from a runabout into a touring-car or tonneau, or vice versa.

The invention has for its further object to provide in connection with the main body or frame of an automobile, a front seat and a rear seat, the rear seat being slidably disposed, so as to be moved beneath the front seat, and the back and side-members or armportions of the said rear seat being made to embrace the corresponding members or portions of the front seat; and, the invention has for its further object to provide in connection with the main body or frame of the vehicle, at the rear portion thereof, a hinged hood or cover-like element, adapted to form with the floor-portion of the vehicle, when used as a run-about, a compartment or chamber, but the said hood or cover-like element comprising a plurality of collapsible or foldably disposed parts, adapted to be foldably disposed and stored away beneath the rear seat of the vehicle, when the latter is used as a touring car or tonneau.

The invention has for its further object to provide in addition to the movable and interchangeably disposed members of the vehicle, simple mechanism for moving the said parts so as to easily bring them into their adjusted and desired positions with relation to each other, and also a simple means for locking the said parts in their adjusted positions.

Other objects of the present invention not at this time more particularly enumerated will be clearly evident from the following detailed description of the said invention.

With the various objects of the present invention in view, the said invention consists, primarily, in the novel interchangeable vehicle hereinafter set forth; and, the invention consists, furthermore, in the novel arrangements and combinations of the various devices and parts, as well as in the details of the construction of the said parts, all of which will be more fully described in the following specification, and then finally embodied in the clauses of the claims which are appended to and which form an essential part of the said specification.

The invention is clearly illustrated in the accompanying drawings, in which:—

Figure 1 represents in side elevation one embodiment of the principles of the present invention, showing the various members of the vehicle in their assembled relation in the form of a run-about; Fig. 2 is a plan or top view; and Fig. 3 is an end view of the same.

Fig. 4 is a detail plan view of the vehicle, showing the various parts in their relative position, to permit of the rear seat to be moved from its position beneath the front seat, the hinged hood or cover-element at the rear being illustrated in its opened position; and Fig. 5 is a view of the various devices and parts represented in said Fig. 4, looking in the direction of the arrow *x*.

Figs. 6 and 7 are both plan views of the rear end-portion of the body of the vehicle, and of the hinged hood or cover-element, showing in succession, the steps for first folding the end-members of the hood, and then the side-members of the same, to permit of the folded or collapsed members of the hood to be turned back upon the flooring of the vehicle-body, to be covered by the rearwardly moved rear-seat.

Fig. 8 is a plan view of the various devices and parts in their respective positions just prior to moving the rear seat into its proper position at the rear portion of the body of the vehicle; and Fig. 9 is a similar view, showing the said rear seat in its rearwardly moved position.

Fig. 10 is a plan view of the same vehicle showing the various members thereof in their assembled relation in the form of a touring car or tonneau; and Fig. 11 is a side elevation of the same.

Figure 12:
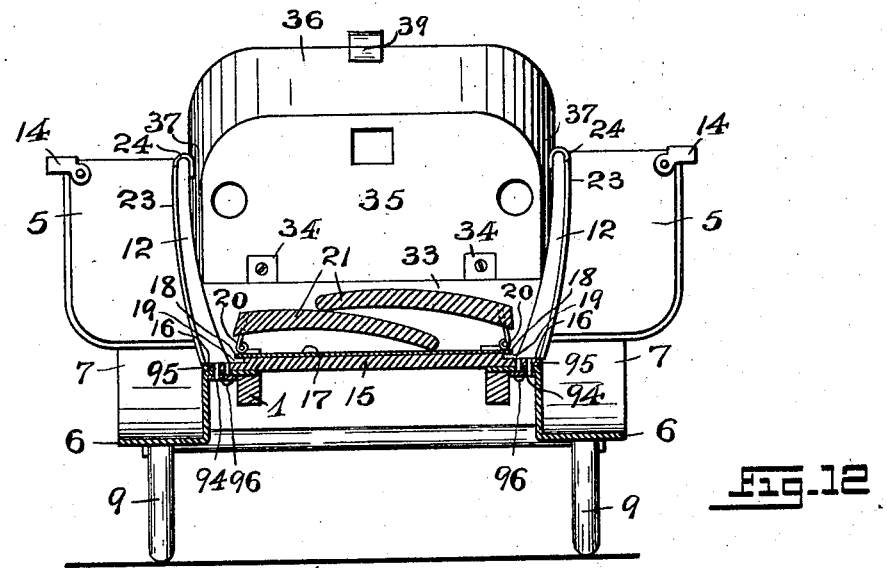
Figure 13:
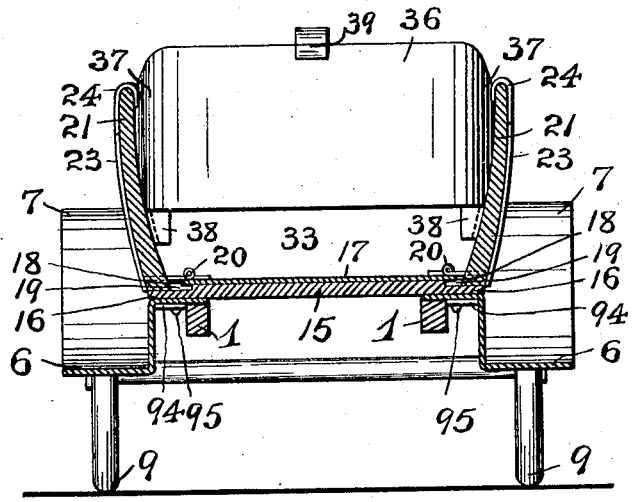

Fig. 12 is a transverse vertical section, taken on line 12—12 in said Fig. 9, looking in the direction of the arrow $x$; Fig. 13 is a similar section, taken on line 13—13 in said Fig. 10, looking in the direction of the arrow $y$; and Fig. 14 is a detail transverse vertical sectional representation taken on line 14—14 in said Fig. 11, looking in the direction of the arrow $u$, some of the devices being omitted from said view, but said view illustrating more particularly one means for locking the rear seat in the rearwardly moved position.

Figure 14:
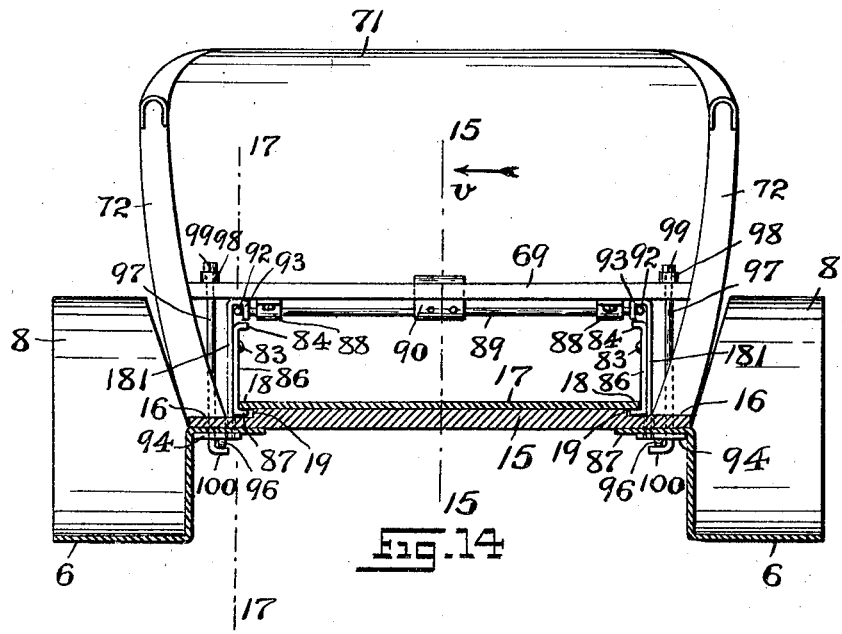
Figures 15, 16:
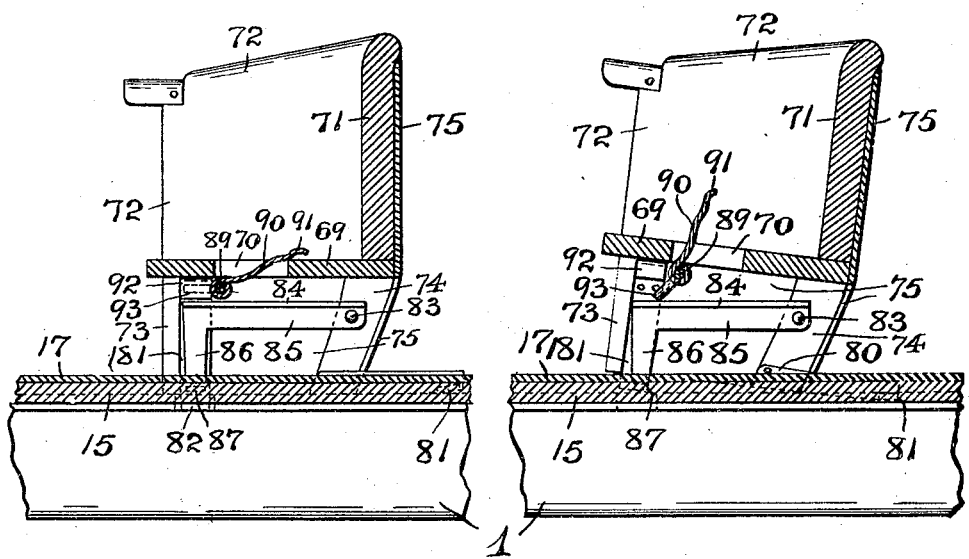

Fig. 15 is a detail longitudinal vertical section, taken on line 15—15 in said Fig. 14, looking in the direction of the arrow $v$ in said figure, when the rear seat is in its locked position; Fig. 16 is a similar view of the same parts showing the mechanism in its manipulated position for slightly tilting the rear seat, to permit said seat to be moved in its forward or rearward direction upon the floor-portion and frame-work of the vehicle; and Fig. 17 is a similar section, said section being taken on line 17—17 in said Fig. 14, looking in the direction of the arrow $v$.

Fig. 18 is a detail bottom plan view of a cam-lock and a portion of the frame-work to which it is secured.

Similar characters of reference are employed in all of the said above described views to indicate corresponding parts.

Referring now to the several figures of the drawings, the reference-character 1 indicates the usual longitudinally extending members of the chassis of an automobile upon which is mounted the body of the vehicle comprising the front hood or cover 2 for the engine. Connected with the flaring portions or members 3 of the said body, by means of suitable hinges, as 4, are two oppositely placed front doors 5. The reference-characters 6 indicate the run-boards, located upon each side of the vehicle, at the respective ends of which are located suitable fenders 7 and 8, extending and arranged above the usual front wheels 9 and rear wheels 10. As shown in Figs. 1 and 11, the said flaring portions or members 3 extend rearwardly, providing the fixed side members 12, formed with suitably cut-out parts or entrance-portions, as 13, in which the said front doors 5 are suitably mounted. Each door 5 is provided upon its upper edge-portion with a pivoted locking latch, as 14, although it will be understood that other means may be employed for holding said doors 5 in their closed positions.

Referring now more particularly to Figs. 9, 12 and 13, it will be seen, that the flooring 15 is cut away at its longitudinally extending marginal edge-portions, as at 16, and suitably mounted upon the upper face of the said flooring is a plate or similar member 17, said plate or member 17 having its longitudinal edge-portions 18 projecting over and above the said cut away portions 16, so as to provide suitable longitudinally extending runways or guides 19, for the purposes hereinafter more fully set forth. Foldably mounted upon and at or near the said edge-portions 18, by means of hinges 20, or other suitable means of pivotal connection, are inwardly collapsible side-members 21, adapted to be folded upon each other, as indicated in Fig. 12, or adapted to stand substantially in vertical relation to said plate or member 17 and the flooring 15, as shown in Fig. 13 of the drawings. As shown, the previously mentioned side-members 12 are provided at the vertical edge-portions 22, indicated by the dotted lines in Figs. 1 and 11, with marginal members, as 23, portions of which project suitably beyond the said vertical edge-portions 22 to provide stops, for arresting the outward movements of said side-members 21 and to hold them in their vertical positions, the said members or stops 23, terminating as at 24, slightly beneath the upper marginal edge-portions of the side-members 12, substantially as shown and for the purposes to be hereinafter more fully described.

The said hinged side-members 21 are also provided with marginal members, as 25, terminating, as at 26, the said marginal members 25 being also made to project beyond the vertical edge-portions 27 of the side-members 21, said edge-portions 27 being indicated in dotted outline. Each hinged side-member 21 is provided with a suitably formed cut out part or entrance-portion, as 28, in which are suitably mounted and secured by means of hinges 29, rear doors 30. The said doors 30 are provided with suitable locks or latches 31, and in like manner, the doors 5 are provided, in addition to the latches 14, with suitable locks or latches 32.

Extending laterally across the body of the vehicle, above the flooring thereof, and secured between the stationary or fixed side-members 12, is a vertically disposed board, or other suitable element, as 33, upon the upper edge of which is pivotally mounted, by means of hinges 34, or other suitable means of pivotal connection, the lower front-edge-portion of the base 35 of a front seat, the said seat comprising the usually shaped back 36 and sides 37. When the parts are in the relative positions indicated in Fig. 13 of the drawings, the lower rear portion of the seat rests upon suitable brackets, as 38, or other suitably constructed supporting means, secured upon and extending inwardly from the inner faces of the said hinged side-members 21. The said back 36 may also be suitably provided with a handle or lifting loop, as 39, or other suitable means serving to raise or lower the said seat as necessity requires, and for the purposes hereinafter more fully described. Suitably secured upon the flooring 15, at the rear end-portion of the body of the vehicle, are hinges 40, or other means of pivotal connection, said hinges or the like carrying a laterally extending plate or member 41, said plate 41, as will be seen from Figs. 2, 3, 4, 5 and 6 of the drawings, being provided with a perforation 42 and an arc-shaped slot 43. Hinged to the upper marginal edge-portion of the said plate or member 41, by means of the hinge-construction 44, is the previously mentioned rearwardly disposed hood or cover-like element. This hood, which is open at the bottom and at the end which extends under normal initial conditions toward the seats of the vehicle consists, essentially, of a top 45 surrounded by the longitudinally extending side-flanges 46 and the laterally extending rear flange 47 with which the said hinge 44 is connected. Hinged, as at 48, to the respective side-flanges 46, are the side-members 49 of the said hood, said side-members being of suitable marginal configuration, and hinged, as at 50, to the respective side-members 49, are a pair of gate-like members or elements, as 51 and 52, adapted to form the closed end-portion of said hood. As shown more particularly in Fig. 5 of the drawings, the laterally extending rear flange 47 of the top 45 has suitably secured upon its inner surface a strap or band 53, usually of metal, and a catch-plate 54 extending slightly above the upper edge of the strap or band, thereby providing a space into which the corner-portions of the two gate-like members 51 and 52 are sprung and held in place when seated upon the upper edge of the said strap or band, as will be clearly evident from an inspection of said Fig. 5. The said members 51 and 52 do not necessarily meet, an open part, as 55 being preferably had, the said members 51 and 52 being also made with the marginal cut out portions 56 which provide an opening in alinement with the hole or perforation 42 in the plate 41. Each gate-like member 51 and 52 is provided upon its inner face with a lift or fingerpiece, as 57, or of any other suitable construction, for lifting or raising said members 51 and 52 from their engagement with the catch-plate 54, when it is desired to move said members from the positions indicated in Fig. 5, upon the hinges 50, to their folded positions against the inner faces of the respective side-members 49, shown in Fig. 6 of the drawings. At the open end-portion of the said hood, the top 45 is provided upon its inner face with a strap or band 58 provided with pins, fingers, or lugs 59, adapted, at the proper time, to enter correspondingly placed receiving portions or holes, as 60, in the rear seat for the purposes to be presently set forth.

To secure the said hinged hood or cover-like element in its "set-up" position, illustrated more particularly in Figs. 1, 2 and 3 of the drawings, a suitable retaining device or holding means is provided. This device consists, essentially, of a bracket 61 suitably secured upon the flooring 15. An angularly disposed rod or bar 62 is also secured upon the flooring, said rod or bar entering a slot 63 in said bracket 62 and being suitably supported at the bottom of said slot. At its free end, the said rod or bar is provided with a retaining head or enlargement, as 64, over which the open or perforated portions of the respective members 51 and 52, and of the laterally extending plate or member 41 are passed, so that the said head or enlargement 64 will sufficiently project from the hole or perforation 42, to be engaged by the locking portion 66 of a locking-lever or catch-bar 65 which is pivoted, as at 67, upon the said plate or member 41. The said locking lever or catch-bar 65 is also provided with a fingerpiece or knob 68 for moving the lever or bar from the dotted raised position shown in Fig. 3 to its locking position, or vice versa, the rivet-head or slightly extending portion of the shank of the said knob 68, upon the rear face of the lever or bar 65 entering into guiding relation with the previously mentioned slot 43 in the plate or member 41.

Slidably or movably disposed upon the body of the vehicle, between the hinged front seat, and the hinged hood or cover-like element just described, when the latter is in its folded back position, and the various side-members and gate-like members thereof are in their folded over and collapsed relations, is the rear seat of the vehicle.

The said rear seat consists of a base 69 provided with an opening 70. At the rear, the base is provided with a back 71, from which extend the side-members or rests 72. Extending downwardly from said base 69 are a pair of front legs or supports 73 and a pair of rear legs 74, substantially as shown in Figs. 15 and 16 of the drawings, the said legs being hidden from view upon the outer sides of the vehicle, by an outer covering or sheathing, as 75, with which the seat may be provided. At the proper places, near the front seat, and near the rear end-portion of the body of the vehicle, the cut away portions 16 of the flooring 15 are provided with two pair of elongated openings or slots, as 76 and 77, and near each pair of said slots the portions 16 are also provided with elongated openings, as 78 and 79.

Extending rearwardly from the lower end-portions of the said rear legs 74 are arms, as 80, said arms being provided at the free ends with laterally extending projections or extensions 81 which are fitted in the previously mentioned runways or guides 19 and are loosely and movably or slidably disposed therein. Suitably secured upon the inner surface-portions of said front legs 73 are plates or bars 181, the lower end-portions 82 of said plates or bars extending below the lower ends of said legs 73, and being adapted, at the proper time, as will presently be set forth, to be brought into registration with and removably inserted in either of the said elongated openings or slots 76 or 77. Pivotally mounted upon pivot-pins 83, or the like, extending from the inner faces of the said rear legs 74 are forwardly extending levers or arms 85, which are flanged, as at 84, said levers or arms being provided at their forward ends with downwardly projecting members or elements, as 86, formed at their lower extremities with laterally extending projections or extensions 87 which are fitted into the previously mentioned runways or guides 19 and are loosely and movably or slidably disposed therein, said projections or extensions 87 being retained against removal from the said runways or guides 19 by being adapted to be brought against the under surface-portions of the longitudinal edge-portions 18 of the plate or member 17, as will be evident from an inspection of Figs. 14 and 17.

Referring now to Figs. 14, 15 and 16, it will be seen, that the base 69 of the rear seat has secured upon its under surface suitably formed bearings 88 in which is oscillatorily mounted a rod or shaft 89 having mounted thereon a manipulating arm or lever, as 90, which extends in an upward direction into and through the opening 70 in said base 69, and has a fingerpiece-portion, as 91, for manipulation of said arm or lever, upon removal of the usual cushion placed upon the base of the said seat.

At its free end-portions, the said rod or shaft 89 is made with angular extensions or fingers, as 93, adapted to be brought into forcible bearing engagement with the flanges 84, or other means, when the lever or arm 90 is brought into the raised position indicated in Fig. 16, thereby pressing the extensions or projections 87 hereinbefore mentioned, down upon the upper surface-portions of the cutaway portions 16 of the flooring 15, thereby tilting the rear seat in the manner indicated in said Fig. 16, and withdrawing the lower end-portions 82 of the bars or plates 81 from the respective elongated openings or slots 76 or 77, to permit of the rear seat to be moved in a forward or rearward direction with relation to the body of the vehicle, as will be clearly understood. After having made the proper adjustment of the rear seat, with the various devices and parts just described, once more returned to the relative positions indicated in said Figs. 15 and 17, the seat can be locked in such adjusted position against movement by means of a locking mechanism, one form of which is illustrated in Figs. 14 and 18.

This locking mechanism consists, essentially, of a series of plates, as 94, suitably secured in the proper place to the bottom of the frame-work of the car, said plates having elongated openings or slots 95, corresponding to the previously mentioned openings or slots 78 and 79.

After adjustment of the rear seat has been made, and by means of the lever 90, the said seat has again been brought into its seating position, as indicated in Fig. 15, the seat is locked in its position by means of a pair of locking rods 97, supported upon the member 69 by means of flanges or collars 98 and provided with wrench-receiving portions 99. Upon turning these rods, when wrenches are thus placed upon the parts 99, angularly extending fingers 100 upon the lower end portions of said rods, will be brought into sliding and jamming engagement with the respective cam surface or portions 96 with which the plates 94 are provided, and whereby the seat, as will be clearly evident will be securely locked in position.

To close the joint between the back of the front seat and the hinged hood or cover-like element, when the latter is moved forward against the rear of said seat, two straps 101 and 102 are employed, the said straps being suitably secured in place by means of pins 103, and being secured in their overlapped relation, as shown in Figs. 1 and 2 of the drawings, by means of any suitable securing device, as 104.

Having in the foregoing described the general arrangements and constructions of the various devices and parts adapted for adjustment relatively to one another for the purposes of providing, interchangeably, a two-seated vehicle, or runabout, or a four-seated vehicle, or touring car, I will now briefly set forth the manner of producing the various adjustments of the said devices and parts.

When the various devices of the vehicle are set up to provide the runabout, shown in the said vehicles 1 and 2 of the drawings, the various parts are brought into the relative positions indicated in Figs. 4, 5 and 6 of the drawings, so as to permit of the foldable or collapsible arrangement of the various parts of the rear seat. Upon releasing the previously mentioned locking device, and folding the various parts, the rear seat is slid in a forward direction toward the front seat so as to embrace the same, as shown in said Fig. 4. The various parts of the rear hood or cover-like element are properly set up and brought into position against the said rear seat-portion which embraces the front seat, as indicated more particularly in Fig. 1 of the drawings. When in these positions the various parts are retained by means of the previously described retaining or locking element illustrated in said Fig. 4 of the drawings, and as shown more particularly in Figs. 2 and 3.

To provide the tonneau-effect, the members of the rear hood or cover like section are opened out and brought into folded or broken relation, as indicated more particularly in Figs. 7, 8 and 12 of the drawings, the rear seat being moved rearwardly, and locked in its proper adjusted position. When the rear seat is thus secured in place, the collapsed or folded parts are hidden from view beneath the base-portion of the said rear seat.

It is thought that any further description as to the proper adjustments and arrangements of the various devices and parts is unnecessary, and will be clearly understood from an inspection of the several figures of the drawings.

With reference to the invention as described in the foregoing specification, I am fully aware that the same is capable of many changes in the general arrangements and combinations of the various devices and parts, as well as in the details of the construction of the said parts without departing from the scope of the present invention as set forth in the said specification, and as defined in the clauses of the claims, which are appended thereto. Hence, I do not limit my present invention to the exact arrangements and combinations of the various devices and parts as described in the said specification, nor do I confine myself to the exact details of the construction of the said parts as illustrated in the accompanying drawings.

I claim:—

1. In a vehicle of the character set forth, the chassis of the vehicle, a main body, longitudinally extending runways located at the sides of said body, a front seat mounted upon said body, means for pivotally connecting the lower front edge-portions of said seat to said body, a rear seat, supporting means extending from said rear seat and movably disposed with relation to said runways, said rear seat being adapted to be moved beneath the front seat, so that the back and side-members of the rear seat can be made to embrace the corresponding members of said front seat, and means connected with said supporting means for tilting said rear seat to permit of the movement of said rear seat upon said runways.

2. In a vehicle of the character set forth, the chassis of the vehicle, a main body, longitudinally extending runways located at the sides of said body, a front seat mounted upon said body, means for pivotally connecting the lower front edge-portions of said seat to said body, a rear seat, supporting means extending from said rear seat and movably disposed with relation to said runways, said rear seat being adapted to be moved beneath the front seat, so that the back and side-members of the rear seat can be made to embrace the corresponding members of said front seat, means connected with said supporting means for tilting said rear seat to permit of the movement of said rear seat upon said runways, and locking means connected with the said rear seat and the said body for securing said rear seat in its rearwardly adjusted position.

3. In a vehicle of the character set forth, the chassis of the vehicle, a main body, a front seat mounted upon said body, means for pivotally connecting the lower front edge-portions of said seat to said body, and a rear seat movably disposed with relation to said front seat longitudinally of said body so that the rear seat can be moved beneath the front seat that the back and side-members of the rear seat can be made to embrace the corresponding members of said front seat, combined with a rear hood, a means of hinge-like connection between said hood and said body of the vehicle, said hood comprising collapsible and foldably disposed elements, and means connected with the body of the vehicle for securing said hood in its fixed position with relation to said body and said embracing seats.

4. In a vehicle of the character set forth, the chassis of the vehicle, a main body, a front seat mounted upon said body, means for pivotally connecting the lower front edge-portions of said seat to said body, a rear seat movably disposed with relation to said front seat longitudinally of said body so that the rear seat can be moved beneath the front seat that the back and side-members of the rear seat can be made to embrace the corresponding members of said front seat, and locking means connected with the said rear seat and the said body for securing said rear seat in its rearwardly adjusted position, combined with a rear hood, a means of hinge-like connection between said hood and said body of the vehicle, said hood comprising collapsible and foldably disposed elements, and means connected with the body of the vehicle for securing said hood in its fixed position with relation to said body and said embracing seats.

5. In a vehicle of the character set forth, the chassis of the vehicle, a main body, longitudinally extending runways located at the sides of said body, a front seat mounted upon said body, means for pivotally connecting the lower front edge-portions of said seat to said body, a rear seat, and means extending from said rear seat and movably disposed with relation to said runways, said rear seat being adapted to be moved beneath the front seat, so that the back and side-members of the rear seat can be made to embrace the corresponding members of said front seat, combined with a rear hood, a means of hinge-like connection between said hood and said body of the vehicle, said hood comprising collapsible and foldably disposed elements, and means connected with the body of the vehicle for securing said hood in its fixed position with relation to said body and said embracing seats.

6. In a vehicle of the character set forth, the chassis of the vehicle, a main body, longitudinally extending runways located at the sides of said body, a front seat mounted upon said body, means for pivotally connecting the lower front edge-portions of said seat to said body, a rear seat, means extending from said rear seat and movably disposed with relation to said runways, said rear seat being adapted to be moved beneath the front seat, so that the back and side-members of the rear seat can be made to embrace the corresponding members of said front seat, and locking means connected with the said rear seat and the said body for securing said rear seat in its rearwardly adjusted position, combined with a rear hood, a means of hinge-like connection between said hood and said body of the vehicle, said hood comprising collapsible and foldably disposed elements, and means connected with the body of the vehicle for securing said hood in its fixed position with relation to said body and said embracing seats.

7. In a vehicle of the character set forth, the chassis of the vehicle, a main body, longitudinally extending runways located at the sides of said body, a front seat mounted upon said body, means for pivotally connecting the lower front edge-portions of said seat to said body, a rear seat, supporting means extending from said rear seat and movably disposed with relation to said runways, said rear seat being adapted to be moved beneath the front seat, so that the back and side-members of the rear seat can be made to embrace the corresponding members of said front seat, and means connected with said supporting means for tilting said rear seat to permit of the movement of said rear seat upon said runways, combined with a rear hood, a means of hinge-like connection between said hood and said body of the vehicle, said hood comprising collapsible and foldably disposed elements, and means connected with the body of the vehicle for securing said hood in its fixed position with relation to said body and said embracing seats.

8. In a vehicle of the character set forth, the chassis of the vehicle, a main body, longitudinally extending runways located at the sides of said body, a front seat mounted upon said body, means for pivotally connecting the lower front edge-portions of said seat to said body, a rear seat, supporting means extending from said rear seat and movably disposed with relation to said runways, said rear seat being adapted to be moved beneath the front seat, so that the back and side-members of the rear seat can be made to embrace the corresponding members of said front seat, means connected with said supporting means for tilting said rear seat to permit of the movement of said rear seat upon said runways, and locking means connected with the said rear seat and the said body for securing said rear seat in its rearwardly adjusted position, combined with a rear hood, a means of hinge-like connection between said hood and said body of the vehicle, said hood comprising collapsible and foldably disposed elements, and means connected with the body of the vehicle for securing said hood in its fixed position with relation to said body and said embracing seats.

9. In a vehicle of the character set forth, the chassis of the vehicle, a main body comprising a flooring, permanently fixed side-members, a front seat mounted upon said flooring, means for pivotally connecting the lower front edge-portion of said seat to said flooring, a rear seat movably disposed with relation to said front seat longitudinally of said body so that the rear seat can be moved beneath the front seat that the back and side-members of the rear seat can be made to embrace the corresponding members of said front seat, and collapsible side-members upon said body, said side-members being adapted to be folded down upon the flooring of said body and also adapted to be disposed in upright relation between said fixed side-members and the rear seat.

10. In a vehicle of the character set forth, the chassis of the vehicle, a main body comprising a flooring, permanently fixed side-members, a front seat mounted upon said flooring, means for pivotally connecting the lower front edge-portion of said seat to said flooring, a rear seat movably disposed with relation to said front seat longitudinally of said body so that the rear seat can be moved beneath the front seat that the back and side-members of the rear seat can be made to embrace corresponding members of the said front seat, collapsible side-members upon said body, said side-members being adapted to be folded down upon the flooring of said body and also adapted to be disposed in upright relation between said fixed side-members and the rear seat, and locking means connected with the said rear seat and the said body for securing said rear seat in its rearwardly adjusted position.

11. In a vehicle of the character set forth, the chassis of the vehicle, a main body comprising a flooring, permanently fixed side-members, longitudinally extending runways located at the sides of said flooring, a front seat mounted upon said flooring, means for pivotally connecting the lower front edge-portion of said seat to said flooring, a rear seat, means extending from said rear seat and movably disposed with relation to said runways, said rear seat being adapted to embrace the corresponding members of said front seat, and collapsible side-members upon said body, said side-members being adapted to be folded down upon the flooring of said body and also adapted to be disposed in upright relation between said fixed side-members and the rear seat.

12. In a vehicle of the character set forth, the chassis of the vehicle, a main body comprising a flooring, permanently fixed side-members, longitudinally extending runways located at the sides of said flooring, a front seat mounted upon said flooring, means for pivotally connecting the lower front edge-portion of said seat to said flooring, a rear seat, means extending from said rear seat and movably disposed with relation to said runways, said rear seat being adapted to be moved beneath the front seat so that the back and side-members of the rear seat can be made to embrace the corresponding members of said front seat, collapsible side-members upon said body, said side-members being adapted to be folded down upon the flooring of said body and also adapted to be disposed in upright relation between said fixed side-members and the rear seat, and locking means connected with the said rear seat and the said body for securing said rear seat in its rearwardly adjusted position.

13. In a vehicle of the character set forth, the chassis of the vehicle, a main body comprising a flooring, permanently fixed side-members, longitudinally extending runways located at the sides of said flooring, a front seat mounted upon said flooring, means for pivotally connecting the lower front edge-portion of said seat to said flooring, a rear seat, supporting means extending from said rear seat and movably disposed with relation to said runways, said rear seat being adapted to be moved beneath the front seat so that the back and side-members of the rear seat can be made to embrace the corresponding members of said front seat, means connected with said supporting means for tilting said rear seat to permit of the movement of said rear seat upon said runways, collapsible side-members upon said body, said side-members being adapted to be folded down upon the flooring of said body and also adapted to be disposed in upright relation between said fixed side-members and the rear seat, and locking means connected with the said rear seat and the said body for securing said rear seat in its rearwardly adjusted position.

14. In a vehicle of the character set forth, the chassis of the vehicle, a main body comprising a flooring, permanently fixed side-members, a front seat mounted upon said flooring, means for pivotally connecting the lower front edge-portion of said seat to said flooring, a rear seat movably disposed with relation to said front seat longitudinally of said body so that the rear seat can be moved beneath the front seat that the back and side-members of the rear seat can be made to embrace the corresponding members of said front seat, and collapsible side-members upon said body, said side-members being adapted to be folded down upon the flooring of said body and also adapted to be disposed in upright relation between said fixed side-members and the rear seat, combined with a rear hood, a means of hinge-like connection between said hood and said body of the vehicle, said hood comprising collapsible and foldably disposed elements, and means connected with the body of the vehicle for securing said hood in the fixed position with relation to said body and said embracing seats.

15. In a vehicle of the character set forth, the chassis of the vehicle, a main body comprising a flooring, permanently fixed side-members, a front seat mounted upon said flooring, means for pivotally connecting the lower front edge-portion of said seat to said flooring, a rear seat movably disposed with relation to said front seat longitudinally of said body so that the rear seat can be moved beneath the front seat that the back and side-members of the rear seat can be made to embrace the corresponding members of said front seat, collapsible side-members upon said body, said side-members being adapted to be folded down upon the flooring of said body and also adapted to be disposed in upright relation between said fixed side-members and the rear seat, and locking means connected with the said rear seat and the said body for securing said rear seat in its rearwardly adjusted position, combined with a rear hood, a means of hinge-like connection between said hood and said body of the vehicle, said hood comprising collapsible and foldably disposed elements, and means connected with the body of the vehicle for securing said hood in its fixed position with relation to said body and said embracing seats.

16. In a vehicle of the character set forth, the chassis of the vehicle, a main body comprising a flooring, permanently fixed side-members, longitudinally extending runways located at the sides of said flooring, a front seat mounted upon said flooring, means for pivotally connecting the lower front edge-portion of said seat to said flooring, a rear seat, means extending from said rear seat and movably disposed with relation to said runways, said rear seat being adapted to be moved beneath the front seat so that the back and side-members of the rear seat can be made to embrace the corresponding members of said front seat, and collapsible side-members upon said body, said side-members being adapted to be folded down upon the flooring of said body and also adapted to be disposed in upright relation between said fixed side-members and the rear seat, combined with a rear hood, a means of hinge-like connection between said hood and said body of the vehicle, said hood comprising collapsible and foldably disposed elements, and means connected with the body of the vehicle for securing said hood in its fixed position with relation to said body and said embracing seats.

17. In a vehicle of the character set forth, the chassis of the vehicle, a main body comprising a flooring, permanently fixed side-members, longitudinally extending runways located at the sides of said flooring, a front seat mounted upon said flooring, means for pivotally connecting the lower front edge-portion of said seat to said flooring, a rear seat, means extending from said rear seat and movably disposed with relation to said runways, said rear seat being adapted to be moved beneath the front seat so that the back and side-members of the rear seat can be made to embrace the corresponding members of said front seat, collapsible side-members upon said body, said side-members being adapted to be folded down upon the flooring of said body and also adapted to be disposed in upright relation between said fixed side-members and the rear seat, and locking means connected with the said rear seat and the said body for securing said rear seat in its rearwardly adjusted position, combined with a rear hood, a means of hinge-like connection between said hood and said body of the vehicle, said hood comprising collapsible and foldably disposed elements, and means connected with the body of the vehicle for securing said hood in the fixed position with relation to said body and said embracing seats.

18. In a vehicle of the character set forth, the chassis of the vehicle, a main body comprising a flooring, permanently fixed side-members, longitudinally extending runways located at the sides of said flooring, a front seat mounted upon said flooring, means for pivotally connecting the lower front edge-portion of said seat to said flooring, a rear seat, supporting means extending from said rear seat and movably disposed with relation to said runways, said rear seat being adapted to embrace the corresponding members of said front seat, means connected with said supporting means for tilting said rear seat to permit of the movement of said rear seat upon said runways, collapsible side-members upon said body, said side-members being adapted to be folded down upon the flooring of said body and also adapted to be disposed in upright relation between said fixed side-members and the rear seat, and locking means connected with the said rear seat and the said body for securing said rear seat in its rearwardly adjusted position, combined with a rear hood, a means of hinge-like connection between said hood and said body of the vehicle, said hood comprising collapsible and foldably disposed elements, and means connected with the body of the vehicle for securing said hood in its fixed position with relation to said body and said embracing seats.

In testimony, that I claim the invention set forth above I have hereunto set my hand this 13th day of April, 1918.

WILLIAM M. SCHLUER.

Witnesses:
FREDK. C. FRAENTZEL,
GEORGE D. RICHARDS.